(12) United States Patent
Coveley et al.

(10) Patent No.: US 8,063,779 B2
(45) Date of Patent: Nov. 22, 2011

(54) CONTAINER INCLUDING A TAMPER-RESISTANT SEAL AND RADIO FREQUENCY IDENTIFICATION SEAL

(75) Inventors: Michael E. Coveley, Richomond Hill (CA); Srdjan Milutinovic, Brampton (CA); Yuping Huang, Richmond Hill (CA)

(73) Assignee: Solbyung Coveley, Ontario (CA)

( * ) Notice: Subject to any disclaimer, the term of this patent is extended or adjusted under 35 U.S.C. 154(b) by 0 days.

(21) Appl. No.: 12/081,444

(22) Filed: Apr. 16, 2008

(65) Prior Publication Data
US 2008/0266109 A1    Oct. 30, 2008

Related U.S. Application Data

(63) Continuation of application No. 11/252,573, filed on Oct. 19, 2005, now abandoned.

(60) Provisional application No. 60/619,692, filed on Oct. 19, 2004.

(51) Int. Cl.
*G08B 13/08* (2006.01)

(52) U.S. Cl. ............ 340/545.6; 340/545.1; 340/541; 340/542; 340/572.1; 340/572.7; 340/687; 340/539.31; 340/303; 235/375; 235/382; 235/385; 235/492

(58) Field of Classification Search ............... 340/545.6, 340/545.1, 541, 542, 572.1, 572.7, 687, 539.31, 340/303; 235/375, 382, 385, 492
See application file for complete search history.

(56) References Cited

U.S. PATENT DOCUMENTS

| | | | |
|---|---|---|---|
| 6,281,793 B1 * | 8/2001 | Haimovich et al. | 340/545.1 |
| 6,281,797 B1 * | 8/2001 | Forster et al. | 340/572.3 |
| 6,340,932 B1 * | 1/2002 | Rodgers et al. | 340/572.7 |
| 6,747,558 B1 | 6/2004 | Thorne et al. | |
| 7,017,807 B2 | 3/2006 | Kipp et al. | |
| 7,098,784 B2 * | 8/2006 | Easley et al. | 340/539.13 |
| 7,098,794 B2 | 8/2006 | Lindsay et al. | |
| 7,239,238 B2 | 7/2007 | Tester et al. | |
| 7,595,727 B2 * | 9/2009 | Grijalva et al. | 340/545.1 |
| 7,649,455 B2 * | 1/2010 | Easley et al. | 340/539.13 |
| 2005/0242957 A1 | 11/2005 | Lindsay et al. | |

* cited by examiner

*Primary Examiner* — Tai T Nguyen
(74) *Attorney, Agent, or Firm* — Harness, Dickey & Pierce, P.L.C.

(57) ABSTRACT

A radio frequency identification seal comprises an antenna including a main antenna portion and at least one break-away portion and an RFID tag coupled and tuned to the antenna. The RFID tag outputs a signature in response to a scanning signal when tuned to the antenna.

29 Claims, 14 Drawing Sheets

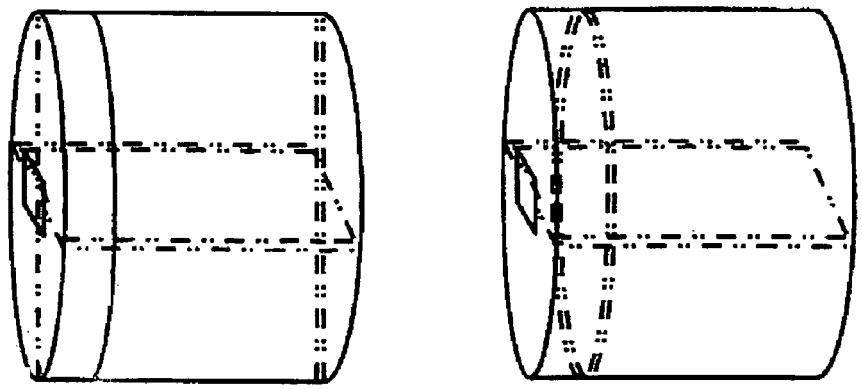
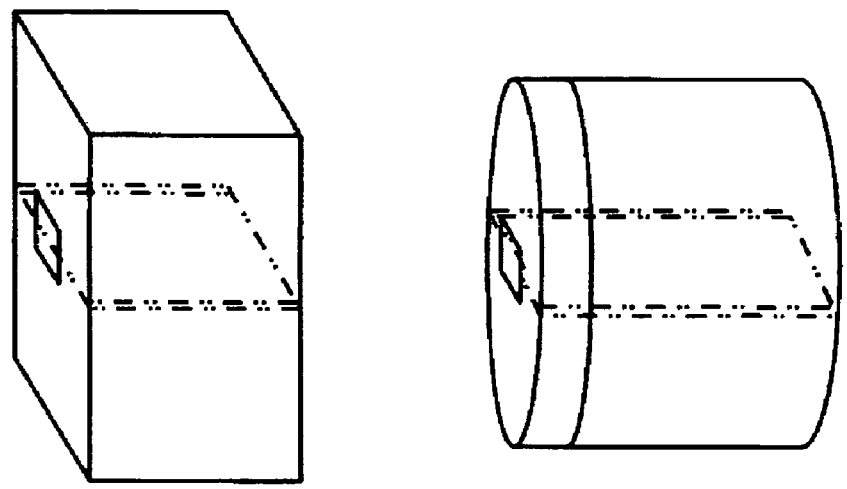
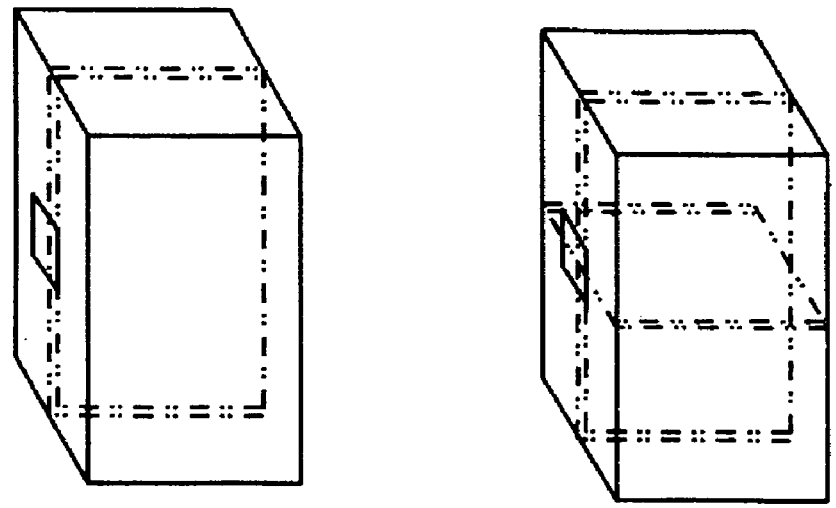
Fig. 13

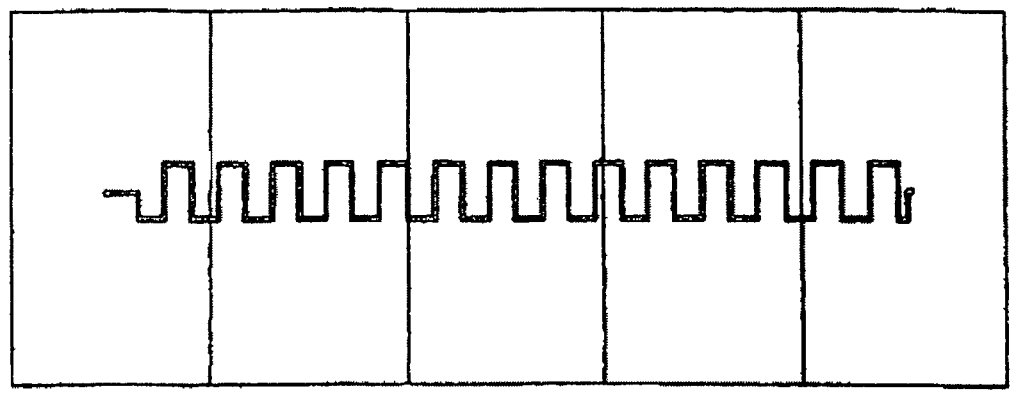
Fig. 14a
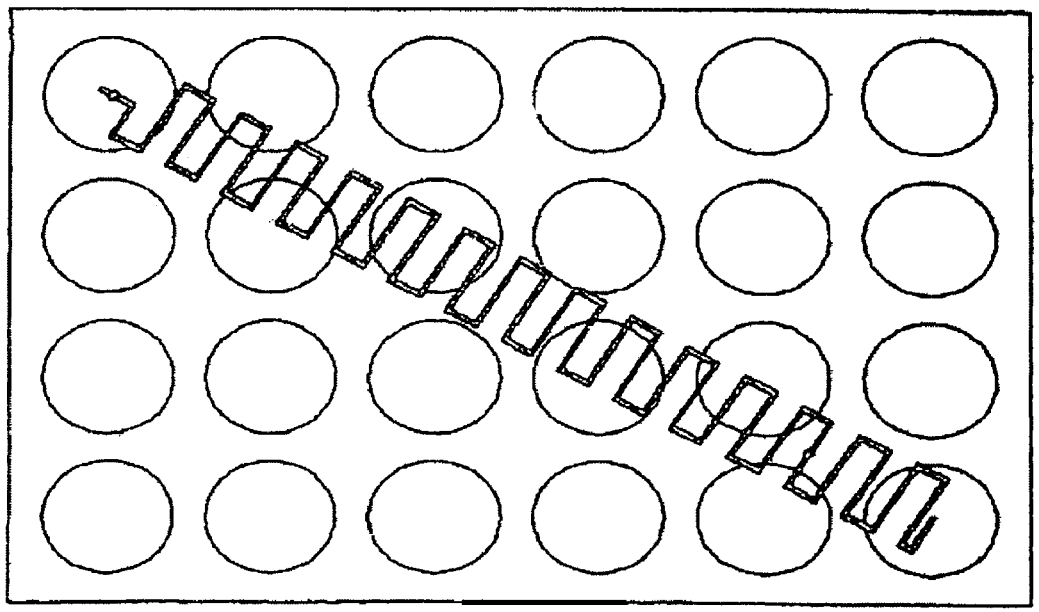
Fig. 14b

CONTAINER INCLUDING A TAMPER-RESISTANT SEAL AND RADIO FREQUENCY IDENTIFICATION SEAL

CROSS-REFERENCE TO RELATED APPLICATIONS

This application is a continuation of and claims benefit under 35 U.S.C. §120 of U.S. application Ser. No. 11/252,573, filed on Oct. 19, 2005 now abandoned, in the U.S. Patent and Trademark Office, the entire contents of which are incorporated herein by reference, and claims the benefit under 35U.S.C. §119(e) of U.S. Application No. 60/619,692, filed on Oct. 19, 2004, in the U.S. Patent and Trademark Office.

FIELD OF THE INVENTION

The present invention relates generally to tamper-resistant packaging and in particular to a container including a tamper-resistant seal and to a radio frequency identification seal.

BACKGROUND OF THE INVENTION

Tamper-resistant packaging is well known in the art. In the pharmaceutical industry, containers holding medicines are designed so that when the contents of the containers are accessed, clear visual indications signifying container access are provided.

In other environments, providing such visual tamper-resistance on containers is difficult. As a result, manual inspection of containers in many environments is required. For example, at border crossings and other inspection points, large containers carried by trucks and ships are typically manually inspected. Containers of this nature generally provide no visual indication signifying if the containers have been opened. This of course slows the inspection process as all containers must be inspected.

U.S. Pat. No. 6,747,558 to Thorne et al. discloses a device for sealing and tracking a container. The device includes a bolt which extends through openings in a latch mechanism on the container. The bolt also passes through spaced coils of the device. The device uses one coil to generate a magnetic field, while monitoring the corresponding magnetic field induced in the other coil. Tampering with the bolt affects the magnetic field, which in turn permits the device to detect the tampering. The device periodically transmits wireless signals which can be remotely received for purposes of tracking the container and monitoring the integrity of the device.

Although the Thorne et al. device allows tampering to be detected, it is complicated and costly to manufacture. As will be appreciated, there exists a need for an improved mechanism that allows secure uncompromised containers to be differentiated from compromised containers.

It is therefore an object of the present invention to provide a container including a tamper-resistant seal and to a radio frequency identification seal.

SUMMARY OF THE INVENTION

According to one aspect there is provided a container comprising:
    a container body; and
    a seal on at least a portion of said container body, said seal including an antenna and a tag tuned to said antenna, said tag becoming detuned when said antenna is compromised during opening of said container.

In one embodiment, the tag outputs a signature in response to a scanning signal when tuned to the antenna. In particular, the tag resonates in response to the scanning signal when tuned to the antenna and outputs a code unique to the tag. The scanning signal is of a predetermined frequency.

The antenna includes a main antenna portion and at least one breakaway portion coupled to the main antenna portion. The at least one breakaway portion separates from the main antenna portion when the container is compromised resulting in the tag becoming detuned from the antenna. The at least one breakaway portion is coupled to the main antenna portion by one-time contacts.

In one embodiment, the main antenna portion is provided on a door of the container and wherein the at least one breakaway portion is provided on a door jamb of the container.

In another embodiment, the tag and antenna are disposed on a substrate adhered to the container.

According to another aspect there is provided a radio frequency identification seal comprising:
    an antenna including a main antenna portion and at least one breakaway portion; and
    an RFID tag coupled and tuned to said antenna, said RFID tag outputting a signature in response to a scanning signal when tuned to said antenna.

The radio frequency identification seal provides advantages in that a determination can be made as to whether a container has been compromised simply by scanning the tag with a scanning signal of the appropriate frequency. If the container has not been compromised, the tag outputs a unique code in response to the scanning signal. If the container has been compromised resulting in one or more break-away portions being separated from the main antenna portion, the tag will not output the unique code in response to the scanning signal thereby clearly to identify the container as being compromised.

BRIEF DESCRIPTION OF THE DRAWING

Embodiments will now be described more fully with reference to the accompanying drawings in which:

FIG. 12b is a schematic diagram of the radio-frequency identification seal shown in FIG. 12a;

FIG. 13 shows other containers including radio-frequency identification seals; and FIGS. 14a and 14b show packing material for use in containers of the type shown in FIGS. 12 and 13 including RFID seal antennae.

DETAILED DESCRIPTION OF THE EMBODIMENTS

A container comprising a container body and a seal on at least a portion of the container body is provided. The seal includes an antenna and a tag tuned to the antenna. The tag becomes detuned when the antenna is compromised during opening of container. The seal is mounted internally of the container making its existence difficult to determine. The seal is typically mounted adjacent the container door or access point and is compromised upon opening of the container thereby to allow entry into the container to be determined. Embodiments will now be described more fully with reference to FIGS. 1 to 14b.

Figure 1:
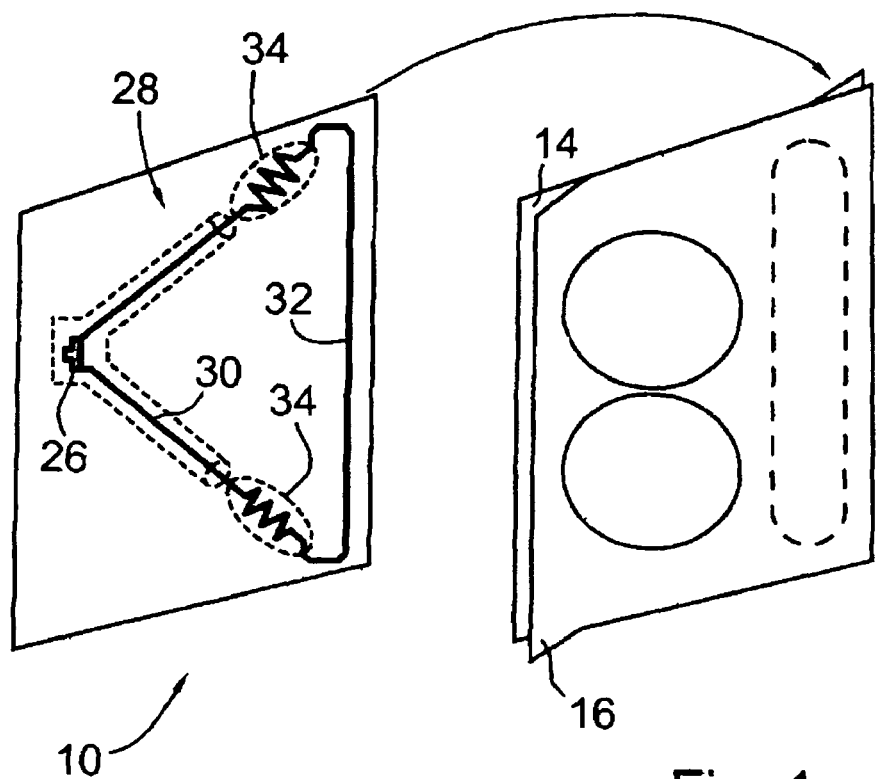
FIG. 1 is an exploded perspective view of a radio-frequency identification seal used to secure a container.
Figure 2:
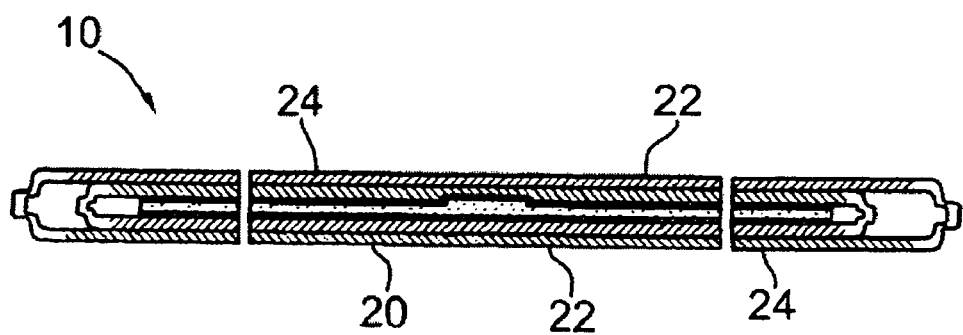
FIG. 2 is a cross-sectional view of the radio-frequency identification seal of FIG. 1.

Turning now to FIGS. 1 and 2, a radio-frequency identification (RFID) seal used to secure a container is shown and is generally identified by reference numeral 10. As can be seen, in this embodiment the RFID seal 10 is generally rectangular and is sandwiched between a pair of cover sheets 14. The outer surfaces of the cover sheets 14 are covered by one time peal-off labels 16. Removal of the labels 16 exposes high-tack adhesive allowing the RFID seal 10 to be secured to the container.

As can be seen in FIG. 2, the RFID seal 10 includes an inner printed electronic layer 20 formed of Kapton-Polymide film. The inner electronic layer 20 is sandwiched between intermediate layers 22 formed of radiolucent conductive spliced polyester/fluoropolymer film. Surrounding the intermediate layers 22 are outer vinyl gel-foam layers 24. The intermediate and outer layers 22 and 24 encapsulate the inner layer 20.

The printed electronic layer 20 includes an RFID tag 26 and an antenna 28 generally taking the shape of a triangle. The antenna 28 is formed using fine German silver wire and comprises a main shielded antenna portion 30 and a break-away portion 32 coupled to the main antenna portion 30 by one-time, break-away contacts 34.

The RFID tag 26 is tuned to the antenna 28 so that when the RFID tag 26 is scanned by a signal at a predetermined frequency and the antenna 28 is intact, the RFID tag 26 resonates causing the RFID tag 26 to output a code unique to the RFID tag 26.

Figure 3A:
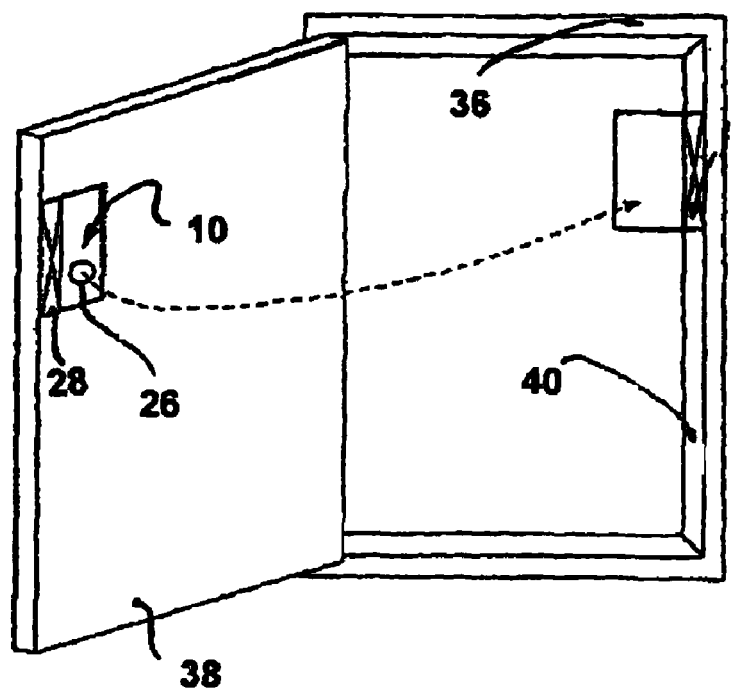
FIG. 3a is an end view of a container showing its door in an open position during installation of the radio-frequency identification seal of FIG. 1.
Figure 3B:
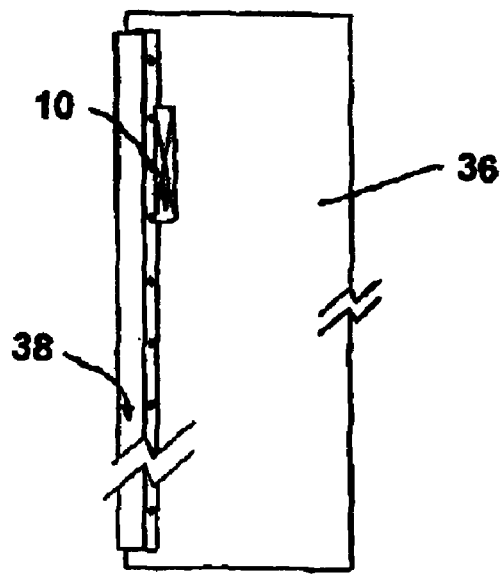
FIG. 3b is a side view of a portion of the container of FIG. 3a with the door in a closed position.

During installation of the RFID seal 10 on a container 36, one of the labels 16 is removed from the RFID seal 10 and the RFID seal 10 is adhered to the inner leading edge of the container door 38 as shown in FIG. 3a. Once the container 36 has been loaded, the other label 16 is removed from the RFID seal 10 and the container door 38 is closed and pushed tight until the door touches the door jamb 40 as shown in FIG. 3b. In this manner, the RFID seal 10 becomes adhered to both the container door 38 and the container body. The outer gel-foam layers 24 help to take up any variances between the door 38 and the door jamb 40, when the door 38 is closed.

When the door 38 is opened, the one-time contacts 34 break, thereby, isolating the break-away antenna portion 32 from the main antenna portion 30. In this case, if the RFID tag 26 is scanned by a signal at the predetermined frequency, the RFID tag does not resonate as the tuning between the antenna 28 and the RFID tag 26 is lost. Hence the RFID tag 26 does not output the unique code. As will be appreciated, the RFID seal 10 allows an inspector to determine very quickly whether the container 36 has been compromised. If the container 36 is packed and sealed at a secure location, scanning the container 36 to determine if the RFID tag 26 outputs the unique code at border crossings and/or other inspection points allows an inspector to determine quickly whether the container 10 requires inspection.

Figure 4A:
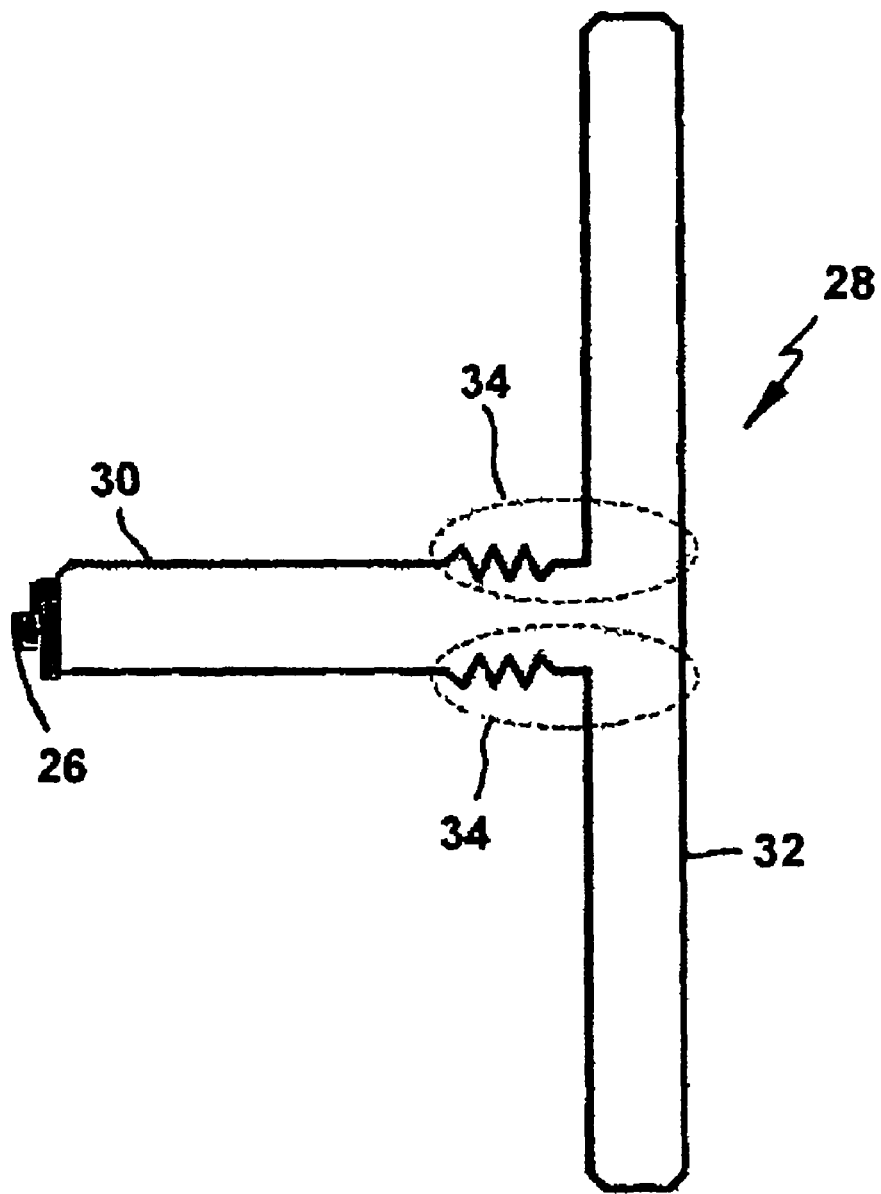
FIGS. 4a and 4b show alternative embodiments of radio-frequency identification seals used to secure containers.
Figure 4B:
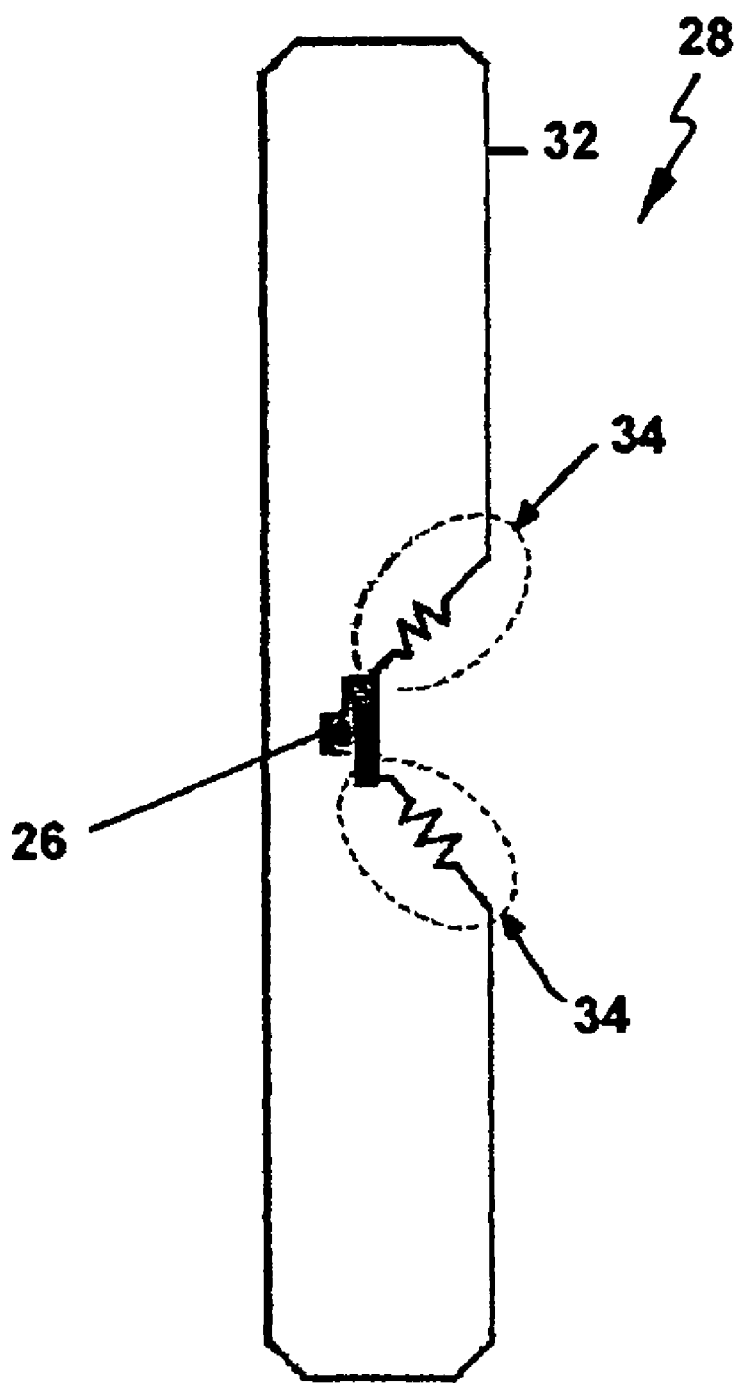

Although the RFID seal 10 is described above as having an antenna 28 that is generally triangular in shape, other antenna configurations are possible. FIGS. 4a and 4b show two alternative electronic layer designs including different shaped antennas 28 and different break-away contact 34 locations. Also, the RFID seal 10 need not be rectangular in shape. The RFID seal 10 may take on any convenient geometric shape such as square, circular, triangular etc.

Figure 5:
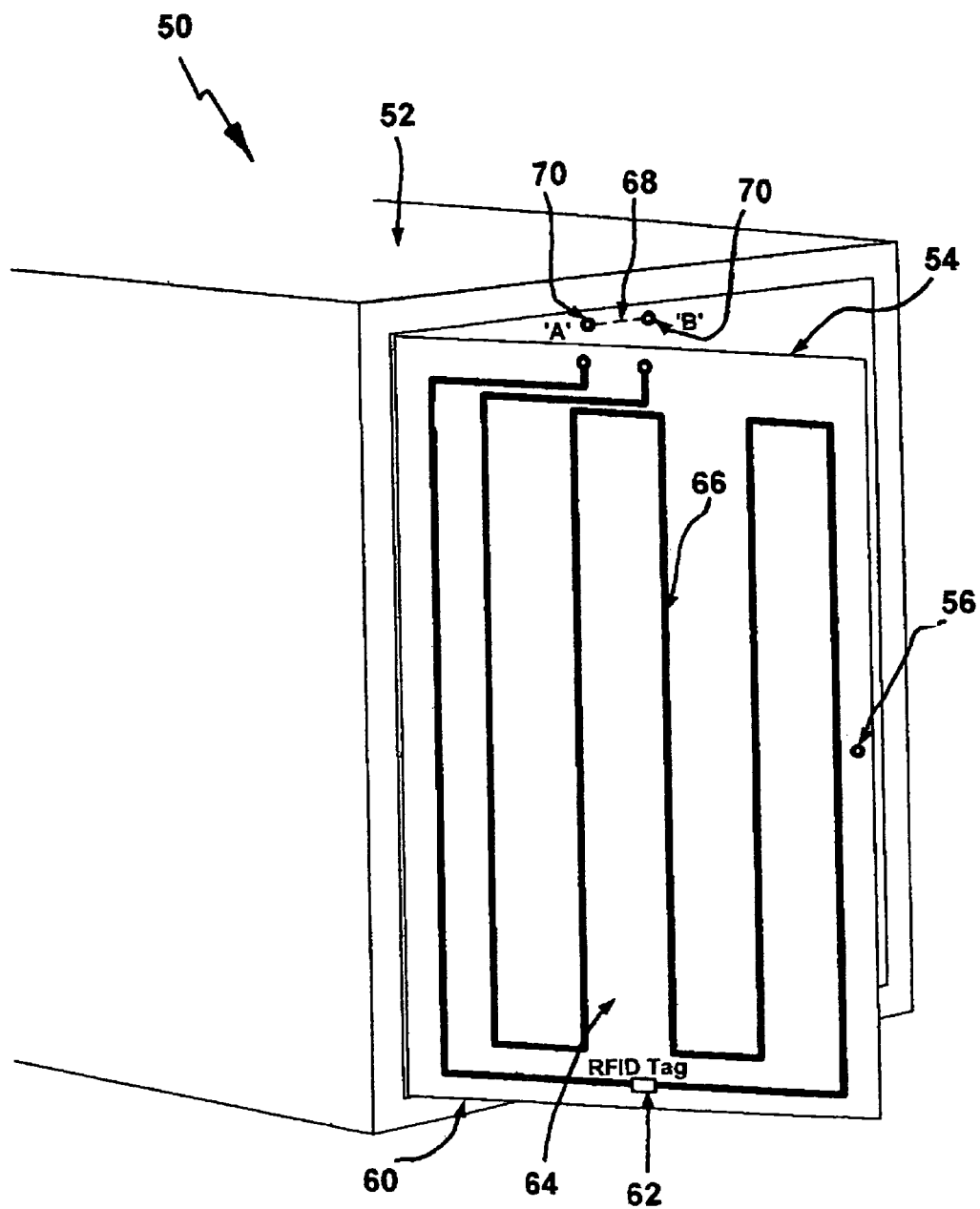
FIG. 5 is a perspective view of a container including another embodiment of a radio-frequency identification seal.
Figure 6:
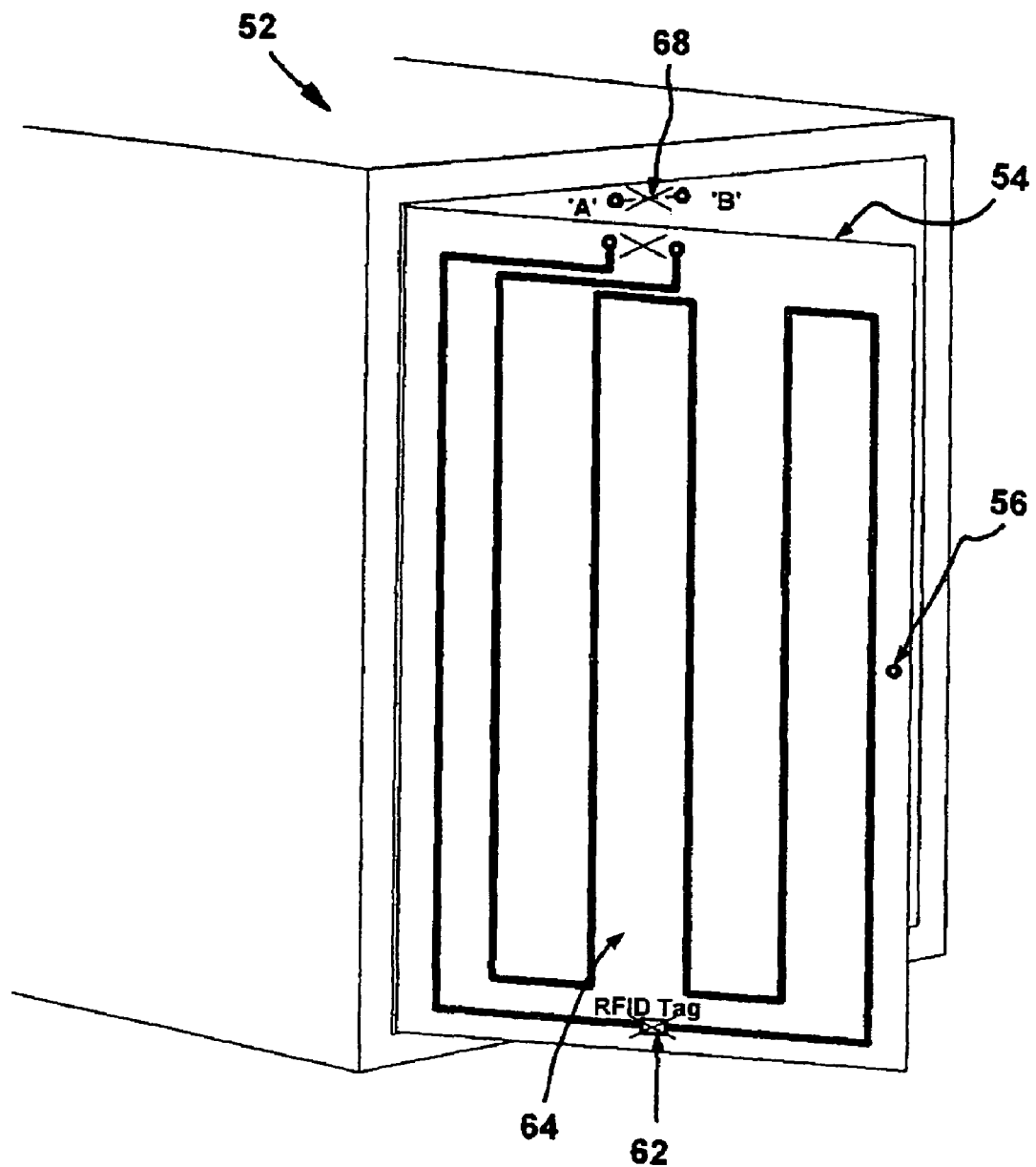
FIG. 6 is another perspective view of the container of FIG. 5 showing the radio-frequency identification seal in a broken state.

Turning now to FIGS. 5 and 6, a container 50 including an alternative embodiment of an RFID seal is shown. As can be seen, container 50 in this embodiment includes a generally rectangular container body 52 having a door 54 at one end. The door 54 is hinged to the container body 52 allowing the door to swing between open and closed positions. A lock 56 is provided on the door 54 to allow the door to be locked in the closed position.

Similar to the previous embodiment, the RFID seal 60 includes an RFID tag 62 and an antenna 64. The antenna 64 is formed using fine German silver wire and comprises a main antenna portion 66 and a break-away portion 68 coupled to the main antenna portion 66 by one-time, break-away contacts 70. The main antenna portion 66 in this embodiment is latticed throughout the door 54. The break-away portion 68 is adhered to the container body 52 at the door jamb.

When the door 54 is opened, the one-time contacts 70 break, thereby, isolating the break-away antenna portion 68 from the main antenna portion 66. Thus, if the RFID tag 62 is scanned by a signal at the predetermined frequency, the RFID tag does not resonate as the tuning between the antenna 64 and the RFID tag 62 is lost. Hence the RFID tag 62 does not output the unique code.

During installation of the RFID seal 60, the RFID tag 62 is tuned to the antenna 64 with the break-away antenna portion 68 free of the container door jamb and coupled to the main antenna portion 66. Once the RFID tag 62 has been tuned, the break-away antenna portion 68 is removed from the main antenna portion 66 and is adhered to the door jamb of the container body 52. The container 50 is then loaded with goods to be transported. Once the container 50 has been loaded, the door 54 is closed and locked. The one-time contacts 70 are then formed between the main antenna portion 66 and the break-away antenna portion 68 to complete the antenna 64. The RFID tag 62 is then scanned to confirm that the RFID tag outputs the unique code signifying that the RFID tag remains tuned to the antenna 64.

Figure 7:
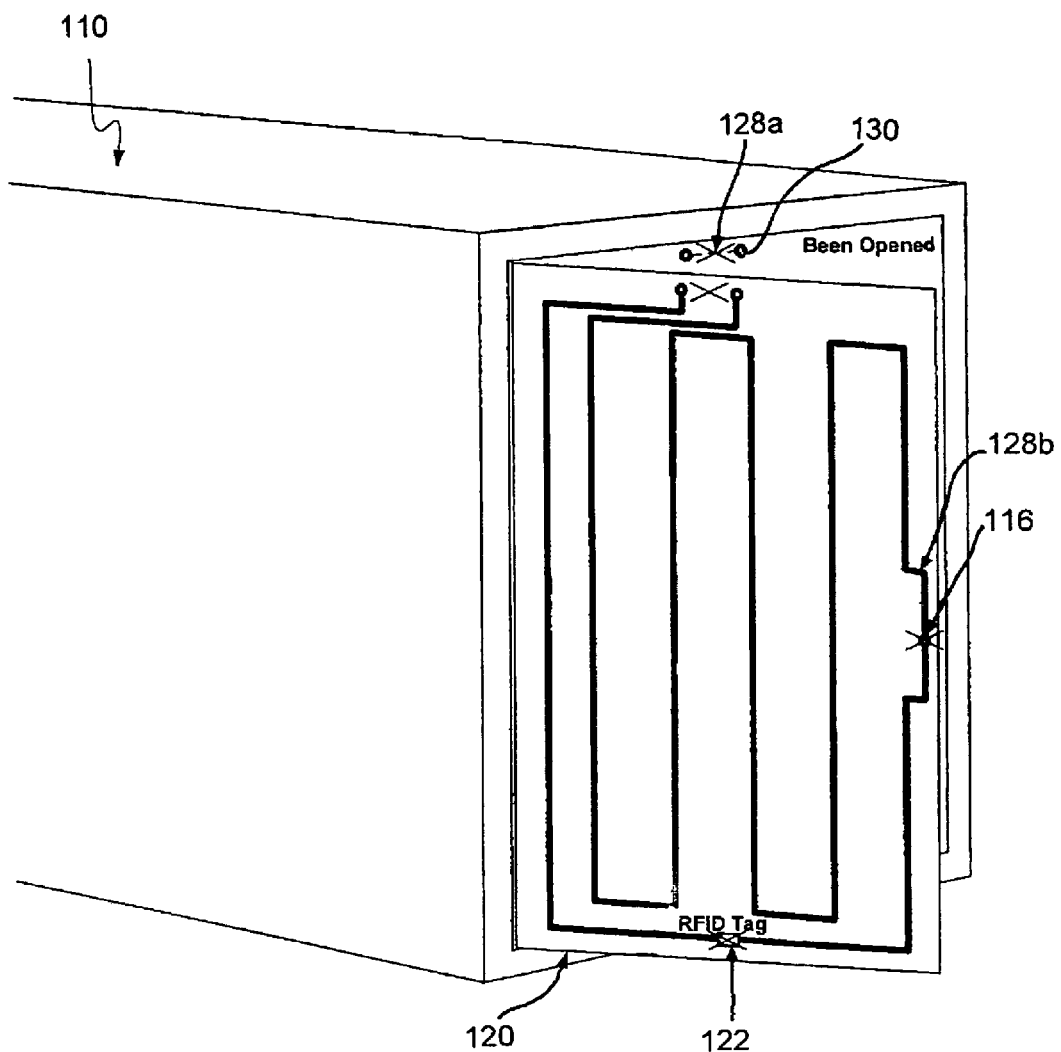
FIG. 7 is a perspective view of a container including yet another embodiment of a radio-frequency identification seal.

FIG. 7 shows another embodiment of a container 110 including an RFID seal 120 comprising an RFID tag 122 and an antenna 124. In this embodiment, the antenna 124 includes, a main antenna portion 124, a break-away antenna portion 128a on the door jamb of the container body 112 as well as a break-away antenna portion 128b adjacent the lock 116. The break-away antenna portions 128a and 128b are coupled to the main antenna portion 124 by one-time, break-away contacts 130. When the door 114 is opened, one or both break-away antenna portions 128a and 128b separate from the main antenna portion 126 via the one-time contacts 130. As a result, the RFID tag 122 becomes detuned and hence does not output the unique code when scanned.

Figure 8:
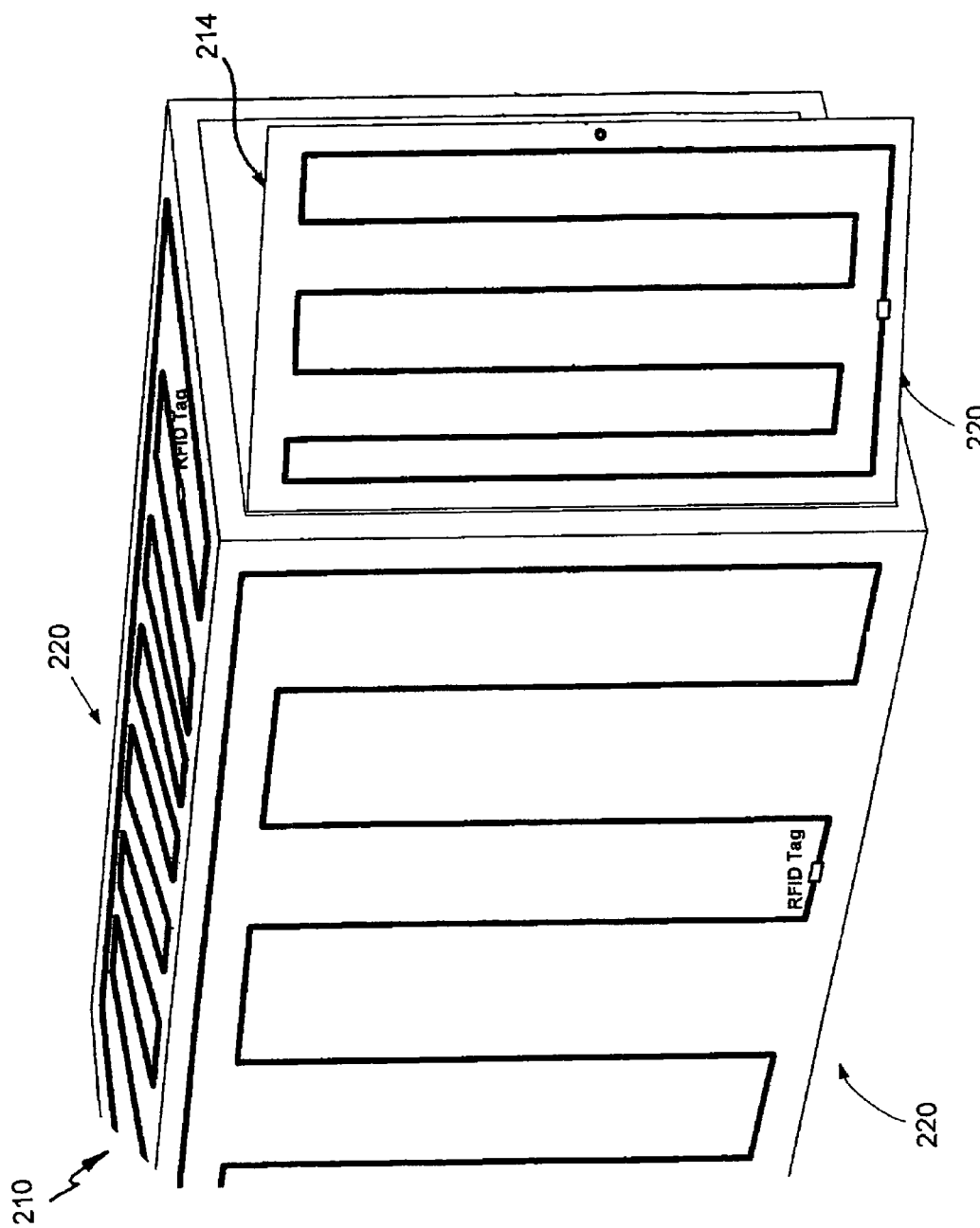
FIG. 8 is a perspective view of a container including a plurality of radio-frequency identification seals.

FIG. 8 shows yet another embodiment of a container 210 including a container body 212, a door 214, and a plurality of RFID seals 220 similar to the RFID seal 10 shown in FIGS. 1 and 2. As can be seen, in addition to the door 214, the top, sides, and bottom of the container body 212 include RFID seals 220.

Figure 9:
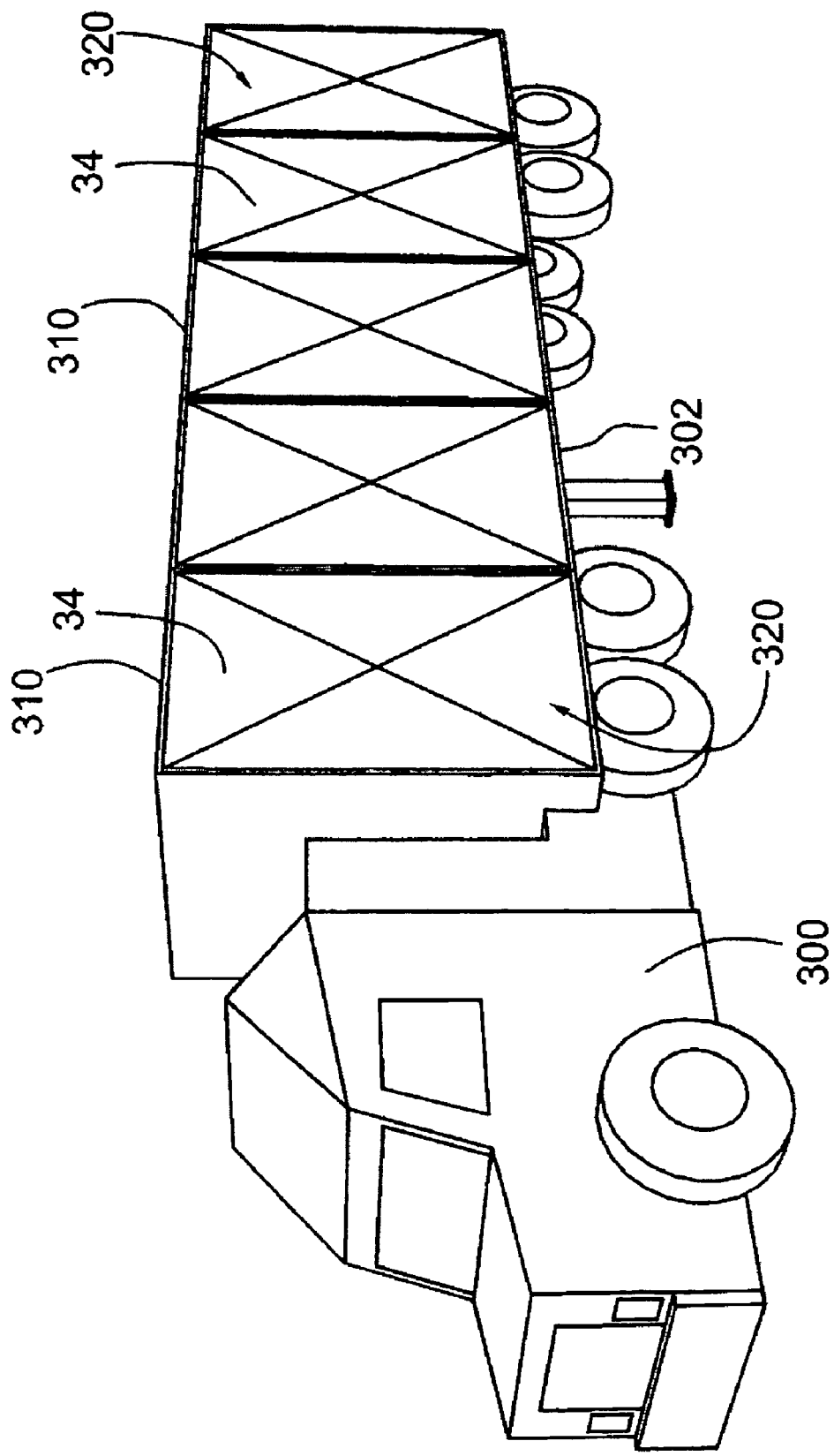
FIG. 9 is a perspective view of a transport truck hauling a trailer having a plurality of containers, each container including a radio-frequency identification seal.
Figure 10:
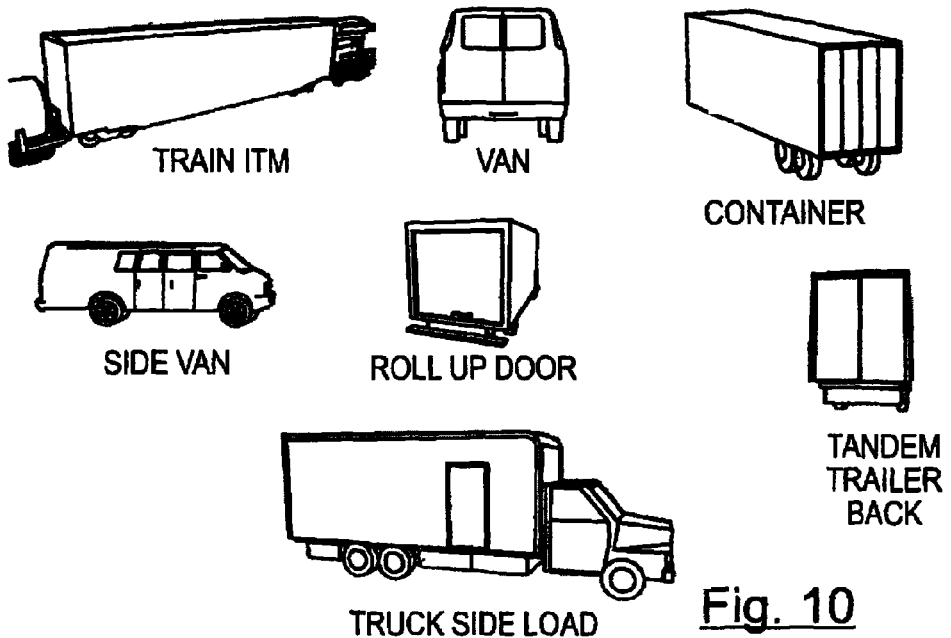
FIG. 10 shows other vehicles having storage capabilities on which radio-frequency identification seals can be mounted.

Although the above embodiments show the RFID seals used to secure containers, those of skill in the art will appreciate that the RFID seals may be used to secure other containment devices. For example, FIG. 9 shows a transport truck 300 hauling a trailer 302 having containers 310 thereon. Each container 310 has a door 314 including an RFID seal 320 of the type shown in FIGS. 5 and 6. FIG. 10 shows other vehicles having storage capabilities on which radio-frequency identification seals can be mounted.

Figure 11:
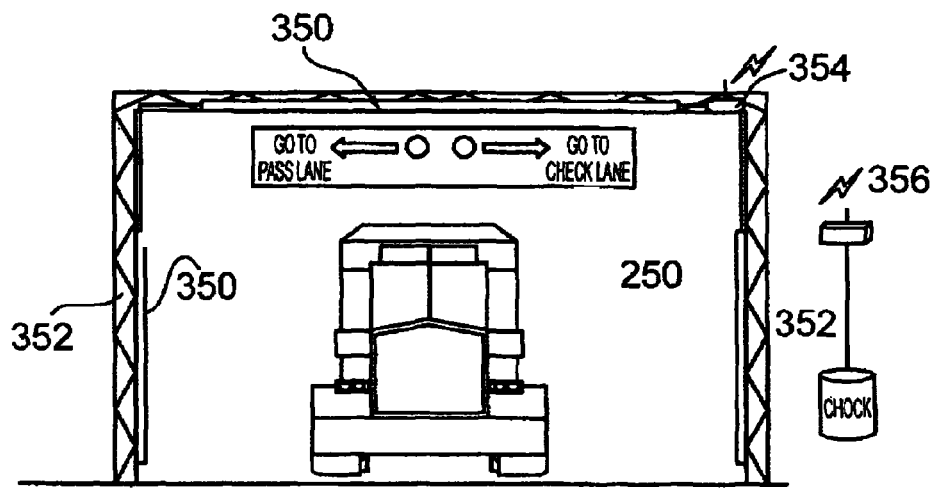
FIG. 11 shows a station for reading RFID seals mounted on trucks and/or other vehicles.

In situations where the RFID seals are used on trucks and/or other vehicles, stations such as that shown in FIG. 11 may be used to check the integrity of the RFID seals. In this case RFID reader antennae 350 are mounted on a frame structure 352 through which trucks and vehicles pass allowing RFID seals carried by the trucks and vehicles to be read. The results of the RFID seal reads can be transmitted by a wireless transmitter 354 to a central location 356 for verification.

Figure 12A:
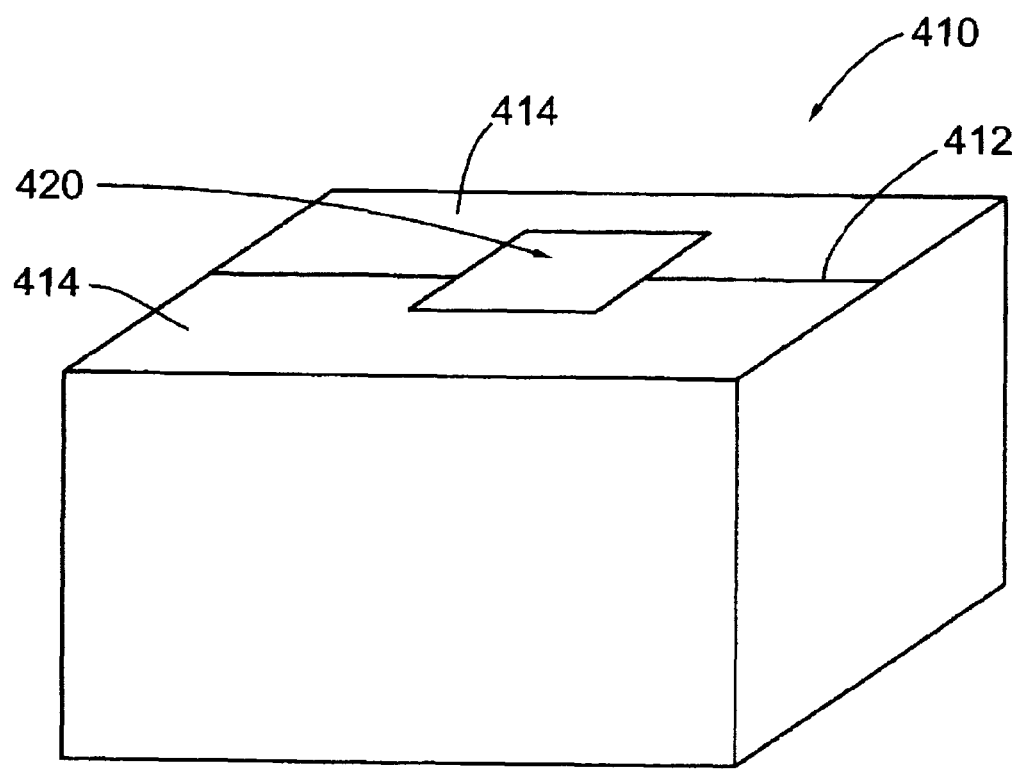
FIG. 12a is a perspective view of a box including a radio-frequency identification seal.
Figure 12B:
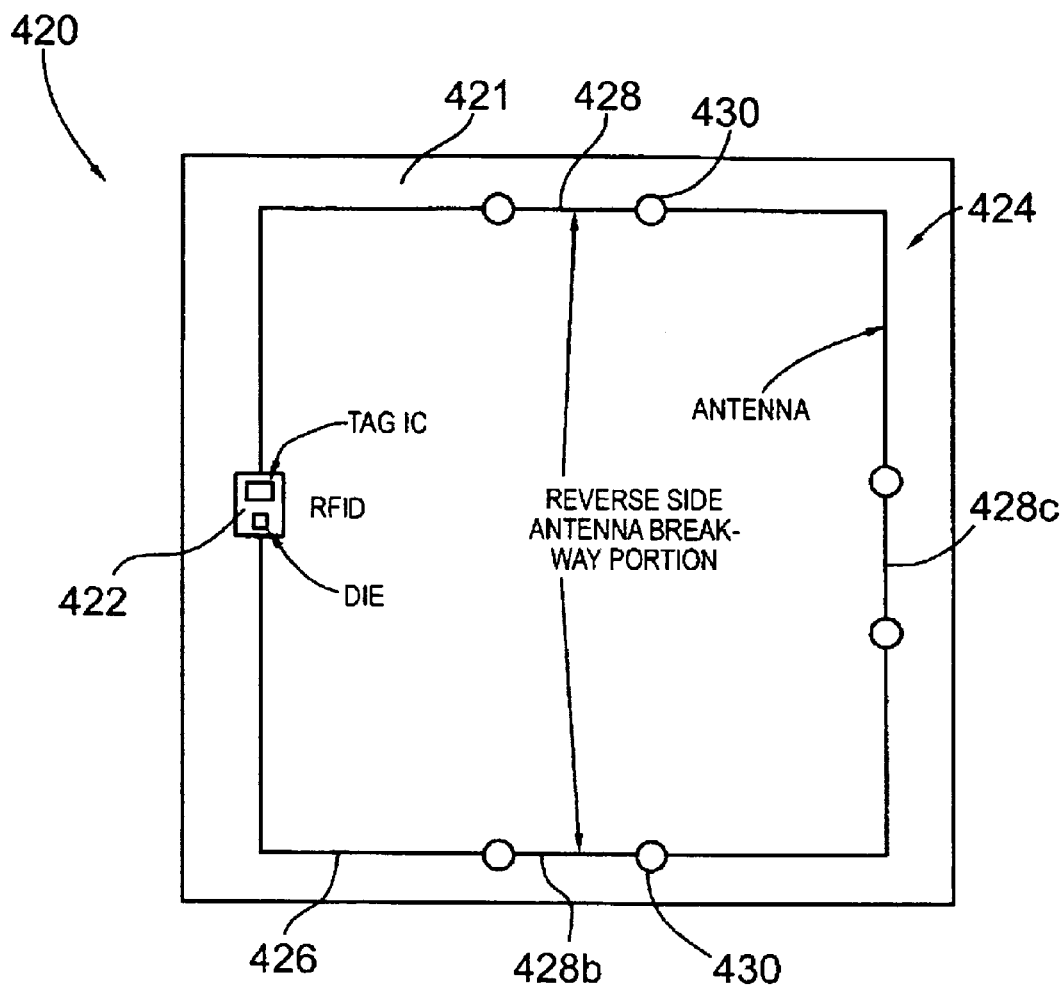

FIGS. 12a and 12b show still yet another embodiment of a container 410 including an RFID seal 420. In this embodiment, the container 410 is in the form of a rectangular or square box having a seam 412 separating the two flaps 414 defining the top of the box. The RFID seal 420 in this case includes a substrate 421 that is adhered to the top of the box 410 and spans the seam 412. An RFID tag 422 and an antenna 424 are also adhered to the substrate 421. The RFID tag 422 is pre-tuned to the antenna 424. The antenna 424 includes a main antenna portion 426 and a plurality of break-away antenna portions 428a, 428b and 428c at spaced locations along the length of the antenna 424. The break-away antenna portions 428a, 428b and 428c are coupled to the main antenna portion 426 by one-time contacts 430. Two of the break-away antenna portions 428a and 428b span the seam 412. In this manner, when the box 410 is opened along the seam 412 and the RFID seal 420 is torn, one or more of the break-away antenna portions 428a, 428b and 428c separate from the main antenna portion 426 via the one-time contacts 430. As a result, the RFID tag 422 becomes detuned and thus, provides no output when scanned at the predetermined frequency.

Although the above-embodiment shows the RFID seal being used to secure a square box by engaging the flaps of the box, those of skill in the art will appreciate that the RFID seal may be used to secure other container configurations. For example, FIG. 13 shows other containers incorporating RFID seals. In the embodiments of FIGS. 12 and 13, the break-away antenna portions of the RFID seal antennae need not engage the containers. Rather, the break-away antenna portions can be incorporated into packing material placed into the containers as shown in FIGS. 14a and 14b. In these cases, the break-away antenna portions are coupled to the main antenna portions on the containers so that when the containers are opened, the break-away antenna portions separate from the RFID seals and the RFID seals become de-tuned.

As will be appreciated, in the above-described embodiments the RFID seals allow containers to be inspected to determine if a container has been compromised quickly and easily simply by scanning the RFID seal with a signal at the appropriate frequency. Containers whose RFID tags do not output a unique code in response to the scanning signal are immediately recognized as having been tampered with. Decisions to inspect containers can thus be made quickly and accurately increasing the efficiency of inspection points such as border crossings.

While specific examples of containers are shown, those of skill in the art will appreciate that the containers make and shape take virtually any form. Also, while specific reference is made to RFID tags, those of skill in the art will appreciate that other types of tags that can be tuned to an antenna and are responsive to scanning signals can of course be used. When RFID tags are used, the RFID tags may be of the passive or active type.

Although embodiments have been described, those of skill in the art will appreciate that variations and modifications may be made without departing from the spirit and scope thereof as defined by the appended claims.

What is claimed is:

1. A cargo shipping container, comprising:
    a container body;
    at least one door coupled to the container body and moveable between an open condition and a closed condition; and
    at least one seal on the container, at least a portion of the at least one seal being disposed between and secured to the at least one door and the container body when the at least one door is in the closed condition;
    wherein the at least one seal includes:
        an antenna; and
        a tag tuned to the antenna; and
    wherein the tag becomes detuned when the antenna is compromised during opening of the at least one door thereby to inhibit reading of the at least one seal.

2. The container of claim 1, wherein the tag outputs a signature in response to a scanning signal when tuned to the antenna.

3. The container of claim 2, wherein the tag resonates in response to the scanning signal when tuned to the antenna and outputs a code unique to the tag.

4. The container of claim 2, wherein the scanning signal is of a predetermined frequency.

5. The container of claim 1, wherein the antenna includes:
    a main antenna portion; and
    one or more break-away portions coupled to the main antenna portion;
    wherein at least one of the one or more break-away portions separates from the main antenna portion when the at least one door is moved from the closed condition to the open condition, resulting in the tag becoming detuned from the antenna.

6. The container of claim 5, wherein at least one of the one or more break-away portions is coupled to the main antenna portion by one-time contacts.

7. The container of claim 5, wherein the main antenna portion is provided on the at least one door of the container, and
    wherein at least one of the one or more break-away portions is provided on a door jamb of the container body.

8. The container of claim 6, comprising:
    a plurality of break-away portions at spaced locations along the antenna.

9. The container of claim 6, wherein the main antenna portion is provided on the at least one door of the container, and
    wherein at least one of the one or more break-away portions is provided on a door jamb of the container body.

10. The container of claim 7, wherein at least one other of the one or more break-away portions is provided adjacent a lock on the door.

11. The container of claim 1, wherein the tag and antenna are disposed on a substrate.

12. The container of claim 11, wherein the substrate is adhered to the at least one door and the container body.

13. A radio frequency identification (RFID) seal, comprising:
- an antenna;
- an RFID tag coupled and tuned to the antenna;
- an inner layer on which the antenna and RFID tag are disposed; and
- at least one compressible layer overlying the inner layer;
- wherein the antenna includes:
  - a main antenna portion; and
  - at least one break-away portion;
- wherein the RFID tag outputs a signature in response to a scanning signal when tuned to the antenna, and
- wherein the RFID seal is sized and configured for disposition between a door and a door jamb of a cargo shipping container.

14. The RFID seal of claim 13, wherein the RFID tag outputs a unique code in response to the scanning signal.

15. The RFID seal of claim 13, wherein the at least one break-away portion is coupled to the main antenna portion by one-time contacts.

16. The RFID seal of claim 13, further comprising:
a plurality of break-away portions.

17. The container of claim 1, wherein the tag resonates in response to a scanning signal when tuned to the antenna.

18. The container of claim 1, wherein the tag outputs a code unique to the tag.

19. The container of claim 1, wherein the tag resonates in response to a scanning signal when tuned to the antenna and outputs a code unique to the tag.

20. The container of claim 2, wherein the tag resonates in response to the scanning signal when tuned to the antenna.

21. The RFID seal of claim 13, further comprising:
a pair of compressible layers between which the inner layer is sandwiched.

22. The RFID seal of claim 21, wherein the compressible layers are gel-foam layers.

23. The RFID seal of claim 21, further comprising:
an intermediate layer disposed between each compressible layer and the inner layer.

24. The RFID seal of claim 21, wherein the RFID tag resonates in response to the scanning signal.

25. The RFID seal of claim 21, further comprising:
adhesive on outer surfaces of the RFID seal to secure the RFID seal to the door and door jamb of the cargo shipping container.

26. The container of claim 5, wherein the at least one seal comprises:
- an inner layer on which the antenna and tag are disposed; and
- at least one compressible layer overlying the inner layer.

27. The container of claim 26, further comprising:
a pair of compressible layers between which the inner layer is sandwiched.

28. The container of claim 27, wherein the compressible layers are gel-foam layers.

29. The container of claim 27, further comprising:
an intermediate layer disposed between each compressible layer and the inner layer.

* * * * *